United States Patent [19]

Mahoney et al.

[11] 4,115,492

[45] Sep. 19, 1978

[54] PROCESS FOR PREPARING MICROPOROUS POLYETHYLENE HOLLOW FIBERS

[75] Inventors: Robert D. Mahoney, Dublin; Stephen E. Schneider, Concord, both of Calif.

[73] Assignee: The Dow Chemical Company, Midland, Mich.

[21] Appl. No.: 763,480

[22] Filed: Jan. 28, 1977

Related U.S. Application Data

[62] Division of Ser. No. 619,431, Oct. 3, 1975, Pat. No. 4,020,230.

[51] Int. Cl.$^2$ ............................................. B29H 7/20
[52] U.S. Cl. ................................. 264/49; 264/210 F; 264/211; 264/344
[58] Field of Search ............ 428/398; 264/205, 41 R; 260/31.4 R; 210/500 M

[56] References Cited

U.S. PATENT DOCUMENTS

| | | | |
|---|---|---|---|
| 3,017,238 | 1/1962 | Levine et al. | 264/176 Z |
| 3,055,297 | 9/1962 | Leeds | 260/31.4 R |
| 3,093,612 | 6/1963 | Cox et al. | 260/31.4 R |
| 3,228,896 | 1/1966 | Canterino et al. | 264/49 |
| 3,423,491 | 1/1969 | McLain et al. | 428/398 |
| 3,674,628 | 7/1972 | Eabre | 264/177 Z |
| 3,679,538 | 7/1972 | Druin et al. | 264/41 |
| 3,745,202 | 7/1973 | Riggleman et al. | 264/41 |
| 3,920,785 | 11/1975 | Druin et al. | 264/41 |

*Primary Examiner*—Jay H. Woo
*Attorney, Agent, or Firm*—Robert R. Stringham

[57] ABSTRACT

Normally hydrophobic, polyethylene hollow fibers having contiguous microporosity are prepared by extruding a heated solution of a polyethylene and an ester from a hollow fiber spinnerette, simultaneously cooling and drawing the forming fibers to a ratio of up to 40 to 1, drawing the gelled fibers to an overall ratio of from about 1.5/1 to 800/1 and then removing the ester. The maximum pore radius ranges up to about 50A, and the fibers have gas permeabilities approaching $10^{-2}$ cc (STP) per cm$^2$ per second per cm. Hg. transmembrane pressure differential. A significant increase in permeability over polyethylene hollow fibers made according to the teachings of the prior art is achieved.

8 Claims, No Drawings

PROCESS FOR PREPARING MICROPOROUS POLYETHYLENE HOLLOW FIBERS

This is a division of application Ser. No. 619,431 filed Oct. 3, 1975, now U.S. Pat. No. 4,020,230.

BACKGROUND OF THE INVENTION

The advantages of permeable hollow fibers as separatory membranes are now well known. For example, the large membrane areas per unit volume of device attained with this membrane configuration are of particular importance in minimizing priming blood requirements for devices such as so-called artificial kidney or artificial lung units. Additionally, a simplification over flat membrane devices is realized in that hollow fibers, by reason of their cross-sectional shape, are essentially self-supporting and do not collapse under the transmembrane pressures required for processes such as reverse osmosis of sea water.

Polyethylene is a particularly attractive material for hollow fiber manufacture because it is inexpensive, relatively inert, non-toxic, readily processed and strong. Polyethylene hollow fibers would be expected to lack the hydrophilicity which is characteristic of the types of membranes which have been most widely used; i.e., in such processes as recovery of water from brines by reverse osmosis. However, hydrophilicity is not essential for permeability separations such as removal of dissolved gases from aqueous or non-aqueous solutions or ultrafiltration of organic solutions containing relatively large solute molecules.

The only process known to Applicants for making polyolefin hollow fibers is that disclosed in U.S. Pat. No. 3,423,491, which teaches the preparation of permselective hollow fibers by melt spinning a mixture of a thermoplastic polymer and a plasticizer, cooling and leaching out the plasticizer. The following plasticizers, disclosed as leachable with alcohols or aromatics, are listed as suitable for the fabrication of semi-permeable hollow fibers from polyolefins: dioctyl phthalate, polyethylene wax, tetrahydronapthalene and chlorinated biphenyls.

It is apparent from the data given in the U.S. Pat. No. 3,423,491 (for cellulose triacetate fibers) that the membrane structures obtained by the disclosed process are much "tighter" than is required for the types of separations for which polyolefin hollow fibers appear to be most suitable. A microporous structure, in which selectivity results primarily from pore size rather than from the chemical nature of the membrane material, would appear to be preferable.

U.S. Pat. No. 3,745,202 is directed to the preparation of porous hollow fibers having a semipermeable outer layer or "skin". A mixture of a cellulose ester or ether with a plasticizer is melt spun and the resulting molten hollow fiber is drawn, gelled by cooling and leached to remove the plasticizer. At this stage, the fiber structure is said to have a graded porosity but to lack the outer skin required for selectively. After a following treatment with hot water, the fibers are said to be more crystaline and more permeable but require further treatment for attainment of selectivity.

U.S. Pat. No. 3,093,612 (corrected to 3,092,612) is directed to polyolefin/alkoxyalkyl ester compositions which are suitable for the preparation of solid polyolefin filaments comprising "small pores" which are not contiguous. A polyolefin/ester mixture is heated to form a solution, forced through a spinnerette, solidified by cooling and immersed in a wash bath, such as isopropanol. The resultant fiber is air dried and then stretched (drawn) to achieve a maximum degree of orientation. Most of the solvent (ester) is said to be removed during coagulation of the fiber and the rest (except for a residual solvent content) by washing.

OBJECTS OF THE INVENTION

A primary object of the present invention is to provide normally hydrophobic, microporous hollow fibers which have high gas permeabilities and can be prepared from a strong, inert, inexpensive and readily processed polymer, i.e., from polyethylene.

A further object is to provide a flexible, practical process for making such fibers.

An additional object is to provide microporous, polyethylene hollow fibers having particular utility as separatory membranes in so-called artificial lungs or oxygenators.

Another object is to provide novel hollow fibers having gas permeabilities up to an order of magnitude greater than hollow fibers of the same size and composition which are made according to the teachings of the prior art.

Yet another object is to provide microporous, oleophilic hollow fibers which, when pore wetted, have utility as separatory membranes in ultrafilters and dialyzers.

It is also an object to provide a process for making microporous, polyethylene hollow fibers in which the permeability of the fibers can be controlled simply by choice of a leaching medium and contact time.

SUMMARY DESCRIPTION OF THE INVENTION

It has now been discovered that microporous, normally hydrophobic hollow fibers can be prepared by spinning a homogeneous solution of polyethylene and an alkoxyalkyl ester in hollow fiber form, gelling the forming fibers, drawing the fibers in a solidified gel state and then contacting the drawn fibers with a liquid ester-removal medium and removing at least a major proportion of the ester. The pores in the resultant fibers are contiguous between the inner and outer fiber surfaces, and are of a size suitable for applications such as blood oxygenation, ultrafiltration, dialysis, etc. The fibers have $O_2$ permeabilities of from about $2 \times 10^{-5}$ to about $1 \times 10^{-2}$ c.c. per $cm^2$ per second per cm Hg. transmembrane pressure.

It has also been discovered that other types of esters which form homogeneous melts with polyethylenes can be employed in place of the preceding alkoxyalkyl esters.

More precisely, the fiber and process of the present invention, and preferred embodiments thereof, may be defined as follows:

(1) A microporous hollow fiber in which the porosity is contiguous, the $O_2$ gas permeability is at least $2 \times 10^{-5}$ c.c. (STP) per $cm^2$ per second per cm Hg. transmembrane pressure differential and said fiber consists essentially of polyethylene.

(2) A fiber as in embodiment 1 in which said oxygen gas permeability is at least $1 \times 10^{-3}$.

(3) A fiber as in embodiment 1 having an oxygen gas permeability, as therein defined, of at least $2 \times 10^{-3}$.

(4) A fiber as in embodiment 1, of which 10 weight percent or less is derived from olefins other than ethylene.

(5) A process for preparing a hollow fiber according to embodiment 1 which comprises:
 (a) providing a polyethylene/ester mixture of which about 20 to about 80 weight percent consists essentially of polyethylene and the balance consists essentially of an ester, or a mixture of esters, of the formula $R^1(COOR^2)_n$, wherein $n$ is 1 or 2 $R_1$ is a mono- or divalent hydrocarbon radical, optionally interrupted by one or two —O— or —S— links, and containing from 1 to 32 carbons, each $R_2$ independently is an aliphatic hydrocarbon radical of 2–26 carbon atoms or consists of two aliphatic hydrocarbon moieties joined by an —O— or —S— link and containing a total of from 3 to 20 carbons,
 (b) heating said polyethylene/ester mixture to a temperature at which it is a homogeneous liquid but below the boiling or decomposition temperature thereof, and extruding it from a spinnerette in the form of a hollow fiber,
 (c) cooling the issuing extrudate to solidify it while maintaining sufficient tension on the forming fiber to achieve a draw ratio of from about 1.0/1 to about 40/1,
 (d) at a temperature above the melting point of the ester, but at least ten degrees below the cloud point of said homogeneous liquid, post-spin drawing the solidified fiber under sufficient tension to achieve an overall draw ratio of from about 1.5/1 to about 800/1,
 (e) contacting the post-spin drawn fiber with a liquid ester-removal medium, at a temperature intermediate of the freezing point of the medium and the flow point of the polyethylene, until at least a major proportion of the ester or ester mixture is removed from the fiber.

(6) The process of embodiment 5 in which said ester has the formula $R^1$—$COOR^2$, in which $R_1$ is a monovalent radical defined as in embodiment 5 and $R^2$ consists of two aliphatic hydrocarbon moieties joined by an —O— link and containing a total of from 3 to 20 carbons.

(7) The process of embodiment 5 in which $R^1$ is an aliphatic radical containing from 10 to 24 carbons.

(8) The process of embodiment 5 in which said ester has the formula $R^1$—$COOR^2$, in which $R^1$ is a monovalent radical defined as in embodiment 5 and $R^2$ is an aliphatic hydrocarbon radical of 2–20 carbon atoms.

(9) The process of embodiment 6 in which said ester is butyl stearate or 2-butoxyethyl oleate.

(10) The process of embodiment 6 in which said ester is 2-butoxyethyl oleate.

(11) The process of embodiment 5 in which said post-spin drawn fiber is contacted with methylene chloride or ethanol until the residual content of said ester therein is less than 5 weight percent.

(12) The process of embodiment 5 in which said overall draw ratio is within the range of from about 20/1 to about 500/1.

DETAILED DESCRIPTION OF THE INVENTION

Suitable polyethylenes for the practice of the present invention are those consisting essentially of units formed by polymerization of ethylene. Polymer units derived from other monomers preferably are not included but may be present in such minor amounts that the essential character of the polyethylene is not lost. Said amounts will generally not exceed about 15 weight percent and desirably are less than about 10 weight percent. Generally, said fiber contains at least about 85 weight percent polyethylene. Preferably, said fibers contain at least about 90 weight percent polyethylene.

Preferably, any non-ethylenic units present are derived from olefinic monomers. It is also preferred that any non-ethylenic units be incorporated as one or more copolymeric components with ethylene. However, discrete homo- or copolymers which are compatible with the polyethylene may be incorporated by known techniques, such as melt blending or solution blending. This, of course, is with the provision that the incorporated material will be retained in the finished microporous fiber as part of a substantially homogeneous microstructure, i.e., that it will not be phase separated or lost during post-spinning processing.

It should be noted that the hollow fibers of the present invention may include residual ester contents which are not so high as to result in loss of their essential polyethylene character. Preferably, the process of the present invention is carried out in such manner that the resulting fibers contain 5% or less of the ester by weight.

Suitable polyethylenes include those which are more branched and less regular, i.e., the so-called "low density" polyethylenes, as well as the more linear, more highly crystalline polyethylenes of the Ziegler and Phillips types, commonly referred to as "high density" polyethylenes.

Such parameters as linearity, crystallinity, average molecular weight and molecular weight distribution are significant largely to the extent to which they are determinative of properties such as tensile strength, flexibility, solubility and melting (or flow) points. The prior art knowledge of these types of dependencies is such as to provide considerable guidance in the selection or design of a polyethylene composition from which to make hollow fibers having the properties (other than porosity) suitable for a particular application. Furthermore, the applications for which fibers of a given polyethylene are most suitable can readily be checked by a combination of standard fiber evaluation tests (tensile strength per denier, for example) and the permeability determination procedures described in the examples herein.

Suitable monomers co-polymerizeable with ethylene are exemplified by olefins, styrene, vinylpyridines, butadiene, acetylene, cyclopentadiene, acrylonitrile, vinyl chloride, vinyllidine chloride, allyl alcohol, diallyl ether, maleic anhydride, tetrafluoroethylene, divinylbenzene monoxide, N-vinylpyrollidone, vinylisobutyl ether, vinyl acetate, vinyl dimethyl boron, cyclohexene, phenylpentenyl thioether, N-methyl-N-butenyl aniline, styrene sulfonic acid and alpha, alpha'-dichloro-p-xylene.

Exemplary suitable olefins co-polymerizeable with ethylene are propylene, 1-butene, isobutylene, 1-pentene, 4-methylpentene-1, 2-butene, 2-pentene, 2-methylbutene-1, 2-methylbutene-2, 3-ethylbutene-1, 1-hexene, 2-hexene, 1-heptene, 1-octene, 1-tridecene, 1-hexadecene and 3-ethyloctadecene. Polymers of olefins containing up to 20 carbons and methods of preparing such polymers are disclosed in numerous publications, including an extensive patent literature. Reference may also be had to compendiums, such as the Encyclopedia of Polymer Science and Technology; Interscience, 1968, volume 9.

Suitable types of non-olefinic polymers which may be incorporated in minor amounts are exemplified by homo- and copolymers of the above listed non-olefin monomers and by nylons, polyesters, polyurethanes, polyalkylene oxides, polyalkylenimines, polyimides, urea/formaldehyde resins, phenolics, and so on. Preferably, such polymers are thermoplastic or but lightly crosslinked. In any event, they are employed only in such amounts as to be miscible with melts of the polyethylenes with which they are to be blended, independently of the presence of any esters. The more polar a polymer of the preceding type is, the lower its solubility in a molten polyethylene will tend to be. The latter tendency can be overcome to a limited extent by copolymerizing minor amounts of unsaturated monomers containing polar groups with the ethylene employed. That is, the resulting co-polymers will be somewhat more compatible with polar polymers. In general, the more polar polymers are not incorporated in amounts greater than about 10 weight percent and preferably constitute from 0 to about 5 weight percent of the material in the fibers produced by the process of the present invention.

Suitable esters for the practice of the present invention are any mono- and diesters, as above defined, capable of forming homogeneous melts with at least one polyethylene as above defined.

U.S. Pat. No. 3,092,612 describes a number of alkoxyalkyl esters of aliphatic monocarboxylic acids which will form homogeneous melts with polyethylene (and other polyolefins). These esters are represented in the patent by the formula R—COO—R'—O—R', wherein R is an aliphatic hydrocarbon chain containing from 1 to 32 carbon atoms and R' is a saturated aliphatic hydrocarbon chain of from 1 to 8 carbons. However, the defining formula, $R^1$—$(COO$—$R^2)_n$, used herein encompasses not only alkoxyalkyl but also alkoxyalkenyl, alkenyloxyalkyl and alkenyloxyalkenyl $R^2$ groups. Further, analogues of the preceding groups in which the oxygen is either omitted or replaced by a sulfur are also included.

Diesters of aliphatic or heteroaliphatic dicarboxylic esters, $R^1(COOR^2)_2$, in which $R^1$ and $R^2$ are as above defined, are also suitable. Such esters in which $R^1$ is a hydrocarbylene moiety of at least 5 carbons are preferred. It is also preferred that each of the $R^2$ groups contains at least 4 carbons, particularly when $R^1$ contains less than 5 carbons.

Similarly, mono- and di-esters as above defined in which $R^1$ is a mono- or divalent hydrocarbyl radical consisting of or containing carbocyclic rings are suitable. Necessarily, $R^1$ in such esters comprising an aromatic ring will contain at least six carbons (at least one benzene ring). Additionally, however, $R^1$ in the latter esters may contain one or more aliphatic moieties, each optionally interrupted by an —O— or —S— link, and having a total of from 1 to 26 carbons. The ester group, or groups (—CO—O—$R^2$) may be attached either to aliphatic or carbocyclic carbons in $R^1$.

Specific exemplary $R^1$ groups are included in the acyl(R—CO—) portions of the monocarboxylate esters listed in U.S. Pat. No. 3,092,612, including those derived from unsaturated acids, such as acrylic, crotonic, isocrotonic, oleic, erucic and elaidic acids. Other specific, exemplary $R^1$ groups, which may be introduced in esters of the above formula by esterification of various alcohols, constitute the $R^1$ group in the following mono- and dicarboxylic acids of the formula $R^1(COOH)_m$ being 1 or 2: propiolic acid, benzoic acid, the isomeric cinnamic acids, 2-decalincarboxylic acid, phenylacetic acid, hexacosanoic acid, the toluic acids, 4-t-butyl-benzoic acid, the biphenylcarboxylic acids, the napthoic acids, cyclobutanecarboxylic acid, the octadecatrienoic acids, abietic acid, 9- or -10- phenyloctadecanoic acid, 3,7,11-trimethyldodeca-2,4,11-trienoic acid, chrysanthemic acid, prostanoic acid, napthalenepropionic acids, pimaric acid and diphenyl acetic acid; phthallic, isophthallic and terephthallic acids, the cyclopropane dicarboxylic acids, 2,4-cyclohexadiene-1,2-dicarboxylic acid, malonic acid, decanedioc acid, epitruxillic acid, isocamphoric acid, fumaric acid, cinnamylidenemalonic acid, cetylmalonic acid, muconic acid, the naphthalene dicarboxylic acids, norcamphane dicarboxylic acid, 2-phenylpentanedioic acid, roccelic acid, 1-phenyl-1,4-tetralindicarboxylic acid, acetylene dicarboxylic acid and 1,2-diphenoxyethane-p,p'-dicarboxylic acid.

Specific exemplary alkanol esters suitable for the practice of the present invention are corresponding mono- or di-esters of the foregoing acids with any of the following monohydroxy alkanes: ethanol, isopropanol, t-butanol, neo-pentanol, 2,3-dimethylbutanol-1, pentamethylethanol, n-heptanol, 2-ethyl-hexanol-1, capryl alcohol, lauryl alcohol, pentadecanol-1 and ceryl alcohol.

Specific exemplary —$OR^2$ groups in which $R^2$ is an alkenoxyalkyl, alkoxyalkenyl or alkenoxyalkenyl radical are derivable from the following alcohols, which may be prepared as indicated and reacted with an anhydride, $R^1CO$—O—CO—$R^1$ or acyl chloride, $R^1CO$—Cl to produce corresponding exemplary esters $R^1$—CO—O—$R^2$:

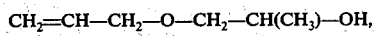

by the reaction of allyl chloride with the monosodium salt of propylene glycol;

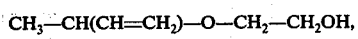

by adduction of methyl vinyl carbinol with ethylene oxide;

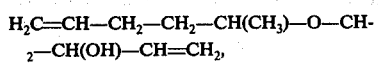

by adduction of 5-hexene-2-ol with butadiene monoxide;

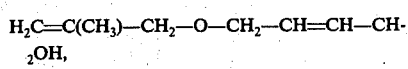

by reaction of methallyl chloride with the monopotassium salt of 2-butene-1,4-diol and

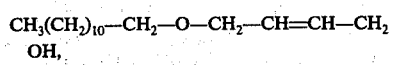

by reaction of lauryl iodide and the monosodium salt of 2-butene-1,4-diol.

A wide variety of unsaturated, acyclic alcohols are known. Exemplary —$OR^2$ grous in which $R^2$ is an alkenyl or alkadienyl radical of from 3 to 20 carbon atoms are derivable from the following alcohols by standard esterification procedures: allyl alcohol, crotyl alcohol, 4-pentene-1-ol, methyl vinyl carbinol, 5-hexen-2-ol, geraniol and oleyl alcohol.

Exemplary —OR² groups in which the main chain in the —R² radical is interrupted by an -S- moiety are derivable from the following alcohols, which may be prepared as indicated:

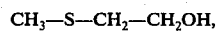

by adduction of methyl mercaptan with ethylene oxide;

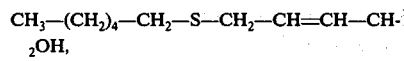

by reaction of sodium hexyl mercaptide with Br—CH$_2$—CH=CH—CH$_2$OH;

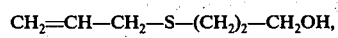

by reaction of allyl chloride and the sodium salt of alpha-hydroxypropyl mercaptan;

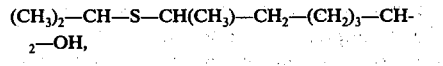

by addition of isopropyl mercaptan to 6-hepten-1-ol in the presence of sulfur and absence of peroxides;

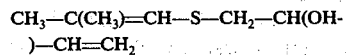

by adduction of isobutenyl mercaptan and butadiene monoxide and

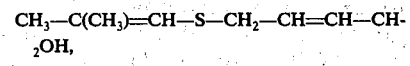

by reaction of sodium isobutenyl mercaptide with Br—CH$_2$—CH=CH—CH$_2$OH.

The preferred esters (or ester mixtures) for the practice of the present invention are those, as above defined, which:

a. form homogeneous melts with a polyethylene at a temperature less than 250° C., when admixed with the polymer in at least one weight ratio within the specified 20/80 to 80/20 range; and/or
b. are liquids at ordinary ambient temperatures; and/or
c. are readily soluble in a relatively low boiling or water-miscible liquid which is a poor or non-solvent for the polyethylene; and/or
d. are readily made or commercially available.

Alkoxy-alkyl esters, such as, for example, those described in U.S. Pat. No. 3,092,612 have all of the foregoing advantages a–d, and accordingly are a preferred group of esters. Among this group, butoxyethyl laurate and butoxyethyl oleate, particularly the latter, are highly preferred.

Similarly, di-alkyl esters of aromatic dicarboxylic acids constitute another preferred group of esters. Particularly preferred esters of this type are dialkyl phthalates such as, for example, dicaprylphthalates, di(2-ethylhexyl) phthalate ("dioctylphthalate"), di(2-ethylbutyl) phthalate ("dihexyl phthalate"), diisobutyl phthalate, diisodecyl phthalate and di(n-octyl, n-decyl) phthalate, all of which have the foregoing advantages a–d.

Suitable polyethylene/ester weight ratios are from about 20/80 to about 80/20. In general, membrane permeability will decrease and selectivity will increase as the proportion of polymer in the spinning solution is increased. The former effect is particularly evident for processes requiring separation of gases from (or introduction of gases to) liquids. In general, the viscosity of the spinning solution and the strength of the fibers produced will increase as the proportion of polymer goes up.

What constitutes an ideal combination of fiber properties of course depends on the contemplated use. However, from the standpoints of ease of fiber preparation and of obtaining a good compromise set of fiber properties, a range of from about 30 to about 70 weight percent polymer in the polymer/ester mixture is preferred.

Method of mixing the polymer and ester(s). The polymer and ester(s) may be mixed by conventional methods. Polymer particles or strands may be "dry" mixed with the liquid or particulated ester(s), heated to form a solution or fluid slurry and then stirred or co-extruded through a heated ram or screw extruder. A particularly effective method for mixing other than in situ is to pre-mix as a melt, re-solidify, fragment and then re-melt and extrude through a hollow fiber spinnerette.

Suitable spinning temperatures range from the lowest temperature at which the polymer/ester mixture is a homogeneous liquid up to the lowest temperature at which boiling or detrimental decomposition occurs. In general, temperatures at least 10° above the cloud point of the solution and at least 10° below the temperature at which any substantial rate of evaporation or decomposition results will be preferred. Considerations such as the dependency of viscosity on temperature and the dependency upon viscosity in turn of spinning solution behavior during and subsequent to issuance from the spinnerette are familiar to those skilled in the art of spinning fibers and will not be dwelt upon here. The optimum spinning temperature for any particular mixture can be determined empirically and this is readily done by carrying out a relatively small number of experimental extrusions with a laboratory type, single orifice spinnerette.

In some instances, the minimum useable spinning temperature may be determined by the safe working pressure of the equipment used to force the polymer solution through the spinnerette at the required rate. That is, the viscosity of the mixture must be low enough to provide for an adequate rate of spinning under a pressure head equal to or less than the maximum safe working pressure of the ram, pump or screw employed. Adjustments in the proportion or composition of the polymer in the mixture can also be made in order to increase or decrease viscosity.

Spin temperatures within the range of about 100° to 250° C. will usually be suitable for the polyethylene/ester mixtures (solutions) employed in the present process. Temperatures of from about 180° to about 220° are preferred, however, Cooling and Initial Drawing The initial draw is made, to a ratio of from about 1.0/1 to about 40/1, while the extrudate is being cooled and gelled. The fiber structure must be "set", i.e., solidified or gelled as an interdispersion of two discrete phases (polymer and ester(s)), before the post-spin, or following draw is made. It is therefore desirable to spool or drum the fiber skein as it is withdrawn from the spinnerette, or otherwise operate, so that the tension exerted during the subsequent draw will not be transmitted back to as yet ungelled fiber portions adjacent the orifice(s). Since some tension will ordinarily be exerted during spooling, it is usually difficult to avoid some drawing, on the order of about 1.01 to about 1.1/1 for example, during cooling and take-up of the newly formed fibers. It is also difficult to make spinnerettes having the small dimensions required for production of thin-walled fibers at lower draw ratios and relatively high overall ratios will therefore often be necessary. The attainment of higher overall ratios is a much more practical operation if it can be effected in two stages. Fortunately, the initial draw can be as high as about 40/1 without markedly reducing the beneficial effects on microporosity attained during the subsequent draw. It has been found that a substantially more permeable structure results if the final dimensions of the fiber are not attained while the fiber is being cooled and solidified.

Cooling can be done by contacting the newly formed fibers with a cool fluid, such as a quench gas or liquid. If desired, close control of the temperature profile in the cooling zone can be attained by flow of a cooling gas through a conduit surrounding the fiber skein. Alternatively, the fibers may be spooled in or passed through a body of a quench liquid; optionally, in counter-current flow. When a quench bath is employed, it may or may not be preceded by a flow of gas, for cooling or for any other desired effect.

The length of the cooling zone and the lowest temperature therein will depend on the solidification temperature for the polymer solution and on how rapidly it is desired to establish this temperature throughout the entire thickness of the fiber wall. The temperature needed to cause rapid solidification will be at least as low as the cloud point of the polymer solution and the temperature employed will usually be ten degrees or more below this point.

A wide variety of fluids are suitable for cooling, since temperatures outside the range of about 0° to 100° C., will usually not be employed. Such fluids of course should be poor solvents or non-solvents for the extruded fiber materials. Cooling fluid temperatures within the range of about 10° to 50° C. are preferred.

In the event that it is desired to employ as the quench bath a liquid in which the ester(s) to be subsequently removed is undesirably soluble, sufficient of the ester(s) to suppress solubility losses may be dissolved in the quench liquid prior to use. Since the residence time of the fibers in the quench bath will usually be quite low, only a few percent of the ester(s) will ordinarily be enough. However, greater amounts, up to the saturation level, may be employed.

Residence times in contact with the cooling medium should be minimized when the medium is a liquid, since ester loss will tend to occur (particularly at higher temperatures) even when the medium is not miscible with the ester. Preferably, contact with a liquid quench medium is terminated as rapidly as is practicable after the fiber has solidified to the desired extent (usually throughout the entire wall structure). Contact with gaseous cooling media can be extended indefinitely and is limited only by considerations of process efficiency.

Post-spin Draw (PSD) Conditions

The cooled, solid fibers are drawn to provide an overall draw ratio of from about 1.5/1 to about 800/1.

Overall draw ratios of about 10/1 to about 500/1 are generally preferred over higher ratios, since the PSD step tends to "close up" the internal structure of the fiber at such higher ratios. However some polymer solutions, particularly at low polymer contents, tend initially to be very open and some "closing down" may be essential to attaining adequate strength and limiting pore size. Where higher overall ratios, i.e., from about 500 to 800, are to be employed, it will usually be desirable to take a relatively high initial draw (up to 40/1), while the polymer and ester mixture is phasing and gelling. The porosity of the final fiber is not highly dependent upon the initial draw, which is important primarily to achieving adequate size reduction without the degree of porosity reduction which will result if essentially all of the draw is taken in the PSD step, i,e., after the polymer and ester(s) are present as discrete phase regions. In general, the overall ratio for both draws will not exceed that required to provide a final wall thickness as low as about 10 microns. The fibers are maintained at or heated to a temperature above the melting point of the ester or ester mixture but at least ten degrees below the cloud point of the polymer/ester solution from which the fibers were spun.

Temperatures of from about 50° to about 110° will generally be preferred for post-spin drawing, particularly when the spin mix contains substantially less than about 40 weight percent of the ester(s). On the other hand, ambient temperatures (about 25°-30° C.) will often be satisfactory when normally liquid esters or ester mixtures are employed. particularly at ester levels greater than about 60 weight percent. The PSD fibers are spooled or drummed under sufficient tension (taken up at a sufficient rate) to attain the desired overall draw ratio. Any requisite heat input may be provided by irradiation or by contact with a heating medium, such as a hot metal roll or a hot gaseous or liquid fluid.

If a liquid heating medium is employed, it can also function, in an alternative mode of operation, as the ester removal medium. In this case, contact with the liquid is prolonged after drawing, usually in the substantial absence of tension. This can be done, for example, by passing the fibers through the hot liquid under draw tension and then taking them up on a spool, drum or frame immersed in the liquid. Immersion is continued until any desired proportion of the ester(s) present in the fibers is removed, as by dissolution and/or by being squeezed out. The removed ester(s), as such or in solution, are separated by flushing or by gravity separation.

In the PSD operation, it is essential that the fibers be brought to temperature and drawn before the proportion of ester they contain drops below the requisite level. An excess of the ester sufficient to compensate for losses during the initial stage of the PSD operation, i.e., before drawing, can be included in the original spin mixture. In this event, a somewhat lower spin temperature may be required in deference to viscosity requirements for spinning. In general, it is preferred that no substantial ester loss or removal occurs prior to the leaching (ester removal) step.

Heating may be carried out in the preceding manner or, preferably, in other ways. For example, the cooled, solid fibers may be heated by irradiation or by contact with a hot gas or liquid to the selected draw temperature while being subjected to the requisite draw tension, taken up on a drum which is not immersed in the heating medium and then placed in or passed through a separate ester removal bath. Optionally, the solid fibers may be preheated, as by brief immersion in a heating bath, before being subjected to the drawing tension.

The heating medium should be a poor solvent and preferably is a non-solvent for the polymer. A particularly preferred medium of the latter type for draw temperatures up to 100° C. is water.

Any non-hazardous fluid which is not detrimentally reactive or instable and is not a good solvent for the polymer can be used as the heating medium, as the drawing medium, or both. Such liquids as are miscible with the ester to be removed are preferred for ester removal but are less desirable as heating or drawing media. The suitability of a given liquid as a medium can readily be determined by test. Also, the literature includes a considerable amount of information on the solubilities of ethylenic polymers in the common solvents.

The fibers do not necessarily have to be in contact with any medium during heating and/or drawing. If desired, the fiber two may be heated by irradiation and drawn while passing through or being taken up in an evacuated zone.

Ester Removal

The ester(s) present in the drawn fibers are removed by dissolution in the ester removal medium or by separation as a solid or liquid phase which is not miscible with the medium. The medium preferably is capable of dissolving the ester but should be a non-solvent for the polymer component of the fibers, since ester removal will generally require substantial contact duration.

Examplary suitable ester removal media are water, alcohols, ketones, dimethylacetamide, carbon tetrachloride, methylene chloride and acetonitrile. Methylene chloride and ethanol are preferred for this purpose. In general, any non-hazardous liquid which is a non-solvent for the polyethylene and is not instable or detrimentally reactive may be employed to effect ester removal. The suitablity of any such liquid for removal of a particular ester is of course readily determinable by test.

Suitable temperatures for the ester removal operation range from just above the freezing point of the medium to within about 10 degrees of the flow point of the polyethylene. Temperatures of from about 20° to about 50° C. are preferred. Temperatures above 50° C. will generally not be employed if the fibers are to be subjected to any substantial amount of tension while the ester is being removed. As a practical matter, temperatures above the normal boiling point of the medium employed (which require superatmospheric pressures) will usually not be employed.

Contact between the fibers and the ester removal medium should be continued until at least a major portion (more than 50%) of the ester or ester mixture has been removed. Since attainment of higher permeabilities in the product fibers is dependent on reduction of the ester content to a low level, it will generally be desirable to remove as much ester as is possible in an economic period of time. However, the rate of removal generally decreases as the concentration of the ester in the fiber decreases and it will thus often be impractical to effect complete removal.

In general, the rate of ester removal will be higher at more elevated temperatures and this fact can be taken advantage of when using higher boiling removal media, such as alcohols.

Optionally, the leached fibers may be left in contact with the ester removal medium until the micropores are wet with or even filled with the medium. When this is done with a water miscible medium, such as ethanol, for example, the medium may then be displaced with water. This is a convenient method by which the normally hydrophobic membrane (fibers) may be pore wet and rendered suitable for carrying out permeability separatory processes with aqueous solutions or suspensions.

The ester will usually be removed immediately after post-spin drawing. However, ester removal may be delayed indefinitely. If the ester content of the unleached fibers does not interfere with "potting", ester removal may even be delayed until an end device incorporating the fibers is put into use. Often, however, it will be preferable to complete device manufacture, i.e., to remove the ester, before the device is shipped or put into use.

EXAMPLES

The following examples illustrate specific embodiments in the practice of the present invention.

Typical Procedure

Stage 1

A solution of the polyethylene and the ester is formed in a stirred and heated vessel, solidified by cooling and cut into pieces. The particulated mixture is placed in a heated tube, melted and ram-extruded through a hollow fiber spinnerette, air being pumped through the center of the spinnerette to keep the forming fiber continuously hollow. The nascent fiber is passed through an 8-inch air cooling zone and then, at room temperature, through a quench bath consisting of two vessels of isopropanol in series, the path length in each vessel being 40 cm. Upon exiting from the quench bath, the fiber is taken up at a preselected rate (depending on the purge rate at the spinnerette and on the initial draw ratio desired) on a rotating spool.

Stage 2

The hollow fiber is unspooled, and drawn at a preselected temperature to a preselected overall draw ratio. The drawing is done manually, as by immersing the fiber portion to be drawn in hot water, waiting about 10 seconds, drawing over another 10 second interval to the desired length, waiting about 10 seconds and then removing the drawn fiber from the water. The same sequence of steps can be carried out in a continuous, mechanical mode of operation by methods readily apparent to those skilled in the art of fiber manufacture.

Stage 3

The hollow fiber is leached in a preselected solvent for a period of from ¼ hour to 24 hours.

Stage Ommission or Sequence Alteration

In two of the following experiments, a fiber (or a portion of a fiber) is leached and then drawn, the sequence of stages 2 and 3 being reversed for purposes of comparison. Leaching is done in most tests after a fiber portion has been potted in a permeability testing assembly.

Permeability Measurements

The permeability of a fiber portion is determined after any stage by cutting off a number of 10 cm. lengths, assembling them with other components as a so-called beaker ultrafilter and measuring the rate of permeation of a gaseous or liquid test fluid. The lengths are arranged in parallel, the resulting bundle is bent in an inverted U-shape and the ends of the bundle potted in short sleeves extending side by side from the bottom of a plastic beaker and fitted with tubing connectors to permit passage of a test fluid or permeate through the fiber lumen. The bottom of the beaker is also provided with dialysate inlet and/or outlet connections. The beaker is inverted and joined by mating threads at its open end to a shallow cup. The effective membrane area of the fiber bundle is calculated from the fiber average diameter, the unpotted length of the fibers and their number (about 10–50, depending on the amount of fiber available). Gas permeation rates are determined by pressurizing the exteriors of the fiber lengths with the test gas and measuring the volume of a liquid displaced by the permeated gas issuing from the fiber lumen in a given time period. For liquids, the permeation rate is determined by measuring the volume of liquid permeate directly. Solute contents in both the feed and permeate are determined by conventional analytical methods.

In the tabulations of data given in the examples below, the symbols used have the following meanings: UFR — ultrafiltration rate — in ml of ultrafiltrate per minute per square meter of membrane surface, adjusted for a standard transmembrane pressure differential of 300 mm Hg; GPR — gas permeation rate — in cc. per $cm^2$ of membrane area per second per cm Hg of transmembrane pressure differential; % Rej. = weight percent of the indicated solute not passed by the membrane.

EXAMPLE 1

Seven series of microporous hollow fibers were prepared from polyethylene (Dow high density P.E. resin 70065, melt index 0.70, density 0.965) having a tensile yield of 4550 lb.f/in$^2$, a shore D hardness of 65, an IZOD impact of 2.0, and a Vicat softening pt. of 127° C.) and 2-butoxyethyl oleate, butyl stearate or dioctyl phthalate to demonstrate the importance of post-spin drawing prior to leaching.

These preparations and the properties of the resultant fibers are summarized in Table 1 below. In the column headed "Stage Sequence", stage numbers and commas are used to show which of the stages (in the basic procedure described above) the fibers were subjected to and in what order. Thus, an entry 1, 2, 3, means stages 1–3 were employed in their ordinary sequence. The entry 1, 3 means step 2 was omitted and 1, 3, 2 means that the sequence of stages 2 and 3 was inverted.

All fibers leached in this example were leached ½ hour in ethanol.

TABLE I
DEPENDENCY OF PERMEABILITY ON HOT-DRAWING AND THEN LEACHING

| | COMPOSITION | | SPINNING & DRAWING CONDITIONS | | | | | FIBER DIMENSIONS($\mu$) | | | | | | | PERMEABILITIES[5] | | | |
|---|---|---|---|---|---|---|---|---|---|---|---|---|---|---|---|---|---|---|
| | Wt.% | | Stage | Spin | Initial Draw | PSD | Overall Draw | Initial[4] | | | Final[5] | | | | | | | % |
| Fiber | P.E.[1] | Ester | Sequence | Temp.[2] | Ratio | Temp. | Ratio | I.D. | O.D. | Wall | I.D. | O.D. | Wall | Gas | GPR | Liquid | UFR | Rej. |
| PE-1 | 26.2 | B.E.O.[3] | 1,3 | 280 | 2.16 | — | 2.16 | 317 | 537 | 110 | 331 | 531 | 100 | $O_2/N_2$ | nil | | | |
| -A | | | 1,2 | | 2.16 | 100 | 13 | | | | 197 | 279 | 41 | $O_2/N_2$ | $1.24\times10^{-4}$ | | | |
| -B | | | 1,2,3 | | 2.16 | 100 | 13 | | | | 197 | 279 | 41 | $O_2/N_2$ | $7.22\times10^{-4}$ | | 1.82 | |
| PE-2-1 | 50.0 | B.E.O. | 1,3 | 270 | 6 | 100 | 6 | 390 | 556 | 83 | 360 | 510 | 75 | $O_2/N_2$ | nil | $H_2O^6$ | | |
| -1A | | | 1,3,2 | | 6 | | 33 | | | | 166 | 227 | 30 | $O_2/N_2$ | $1.7\times10^{-5}$ | $H_2O^6$ | 0.78 | |
| | | | | | | | | | | | | | | | | $H_2O^7$ | 0.67 | |
| | | | | | | | | | | | | | | | | $H_2O^6$ | 3.59 | |
| | | | | | | | | | | | | | | | | $H_2O^7$ | 2.47 | |
| -1B | | | 1,2,3 | | 6 | 100 | 33 | | | | 179 | 229 | 25 | $O_2/N_2$ | $1.0\times10^{-3}$ | | | |
| PE-5A-1 | 50.0 | B.E.O. | 1 | 200 | 7 | — | 7 | 401 | 577 | 88 | 401 | 577 | 88 | Air | $1.9\times10^{-7}$ | $H_2O^6$ | 83.4 | |
| -2 | | | 1,3 | | 7 | | 7 | | | | | | | | $1.3\times10^{-6}$ | $H_2O^7$ | 36.0 | |
| -3 | | | 1,2,3 | | 7 | 100 | 35 | | | | 248 | 304 | 28 | $O_2$ | $7.0\times10^{-3}$ | $H_2O^6$ | 0.6 | 95.1 |
| | | | | | | | | | | | | | | | | $H_2O^7$ | 0.2 | |
| -4 | | | 1,2,3 | | 7 | 100 | 105 | | | | 172 | 204 | 16 | $O_2$ | $5.2\times10^{-4}$ | $H_2O^6$ | 50.7 | |
| -5 | | | 1,2,3 | | 7 | 83 | 35 | | | | 248 | 304 | 28 | $O_2$ | $5.0\times10^{-3}$ | $H_2O^7$ | 20.3~100 | |
| PE-5B-1 | 50.0 | B.E.O. | 1 | 200 | 1.4 | — | 1.4 | 755 | 1079 | 162 | | | | Air | $1.4\times10^{-7}$ | | | |
| -2 | | | 1,3 | | 1.4 | — | 1.4 | | | | | | | | $5.0\times10^{-6}$ | | | |
| -3 | | | 1,2 | | 1.4 | 83 | 7.0 | | | | | | | | $7.2\times10^{-7}$ | $H_2O^6$ | 147. | |
| -4 | | | 1,2,3 | | 1.4 | 83 | 7.0 | | | | 317 | 469 | 76 | | $7.6\times10^{-3}$ | | | |
| PE-5C-1 | 50.0 | B.E.O. | 1 | 200 | 1.4 | — | 1.4 | 765 | 1091 | 163 | | | | Air | $7.6\times10^{-8}$ | | | |
| See -2 | | | 1,3 | | 1.4 | 83 | 7.0 | | | | | | | | $4.8\times10^{-7}$ | | | |
| Note -3 | | | 1,2 | | 1.4 | 83 | 1.4 | | | | | | | | $5.1\times10^{-7}$ | | | |
| B -4 | | | 1,2,3 | | 1.4 | 83 | 7.0 | | | | 328 | 486 | 79 | | $2.7\times10^{-3}$ | | | |
| PE-7-1 | 50.0 | B.S.[9] | 1,3 | 200 | 1.4 | 83 | 6.0 | 331 | 507 | 88 | 331 | 507 | 88 | $O_2$ | $9.2\times10^{-6}$ | $H_2O$ | 0.332 | |
| -2 | | | 1,3,2 | | 1.4 | 83 | 18 | | | | 259 | 357 | 49 | | $5.3\times10^{-6}$ | | 1.75 | |
| -3 | | | 1,2,3 | | 6.0 | 83 | 18 | | | | 238 | 334 | 48 | | $9.0\times10^{-3}$ | | 148. | |
| PE-17 | 50.0 | DOP[10] | 1 | 200 | 10 | — | 10 | 297 | 479 | 91 | | | | $O_2$ | nil | | | |
| -A-1 | | | 1,3 | | 10 | — | 10 | 297 | 479 | 91 | 297 | 479 | 91 | $O_2$ | $1.3\times10^{-5}$ | $H_2O^6$ | 1.6 | |
| -A-2 | | | | | | | | | | | | | | | | | | | |
| -B-1 | | | 1,2,3 | | 7 | 83 | 32 | 376 | 552 | 88 | 376 | 552 | 88 | $O_2$ | $4.4\times10^{-4}$ | $H_2O^6$ | 52. | |

Notes for Table I:
[1]Polyethylene
[2]Temperature of spin block, ° C.
[3]Butoxyethyl oleate
[4]After initial draw and before leaching; I.D. = Internal Diameter, O.D. = Outside Diameter.
[5]After last stage listed hot-draw (2) or leach (3)
[6]Distilled water
[7]2% aqueous albumin
[8]No quench bath employed. Air cooled only.
[9]Butyl stearate
[10]"Dioctyl" phthalate (Di-(2-ethylhexyl)phthalate)

The relative effects, on fiber permeability, of leaching alone, post-spin drawing alone and post-spin drawing and then leaching are apparent from the date in Table I for fibers PE-1, PE-2, PE-5A, -5B and -5C. The effect of leaching before drawing, rather than afterwards, is evident from the results for fiber PE-7. It will be seen that post-spin drawing, and then leaching, is essential to the attainment of permeabilities above about $1.7 \times 10^{-5}$ c.c. per $cm^2$ per second per cm. Hg. transmembrane pressure.

It is also apparent, from the results given in Table I, for fibers PE-17 A-1, 2 and B-1, that a significant improvement in permeability results when hollow fibers prepared from polyethylene and dioctyl phthalate, in accordance with the teachings of U.S. Pat. No. 3,423,491, are post-spin drawn before being leached to remove the "plasticizer".

EXAMPLE 2

Hollow fibers were spun at 200° c. from a mixture of BEO (47 wt. percent) and Dow high density polyethylene resin 85965 (53 wt. percent; Melt Index 0.85, Density 0.965, Tensile Strength 4200 psi, Flexural Modules 24,500 psi). The relative rates of take-up and extrusion were such that a draw ratio of 14.3/1 resulted. The nascent fibers were quenched with air only. The dimensions and mechanical properties (averaged for three replicate specimens each) of the quenched fibers were as follows: I.D. 380μ, O.D. 480μ, wall thickness 50μ; Tensile Strength 63 gmf (1171 psi), Tensile Yield Stress 34 gmf (648 psi), Ultimate Elongation 886%, Tensile Yield Strain 7.5% and Elastic Modules 645 gmf (8600 psi). Some of these fibers were immersed in hot (83° C.) water for 10 seconds, drawn over a period of about 2 seconds to a wall thickness of 23 microns (post-spin draw ratio 3.4/1), allowed to soak in the hot water for about 10 seconds more and then placed on paper to cool and dry.

The rates of BEO leaching (at 25° C.) from both the drawn and undrawn fibers with methylene chloride, 1,1,1-trichloroethane and ethanol were determined and are given in Table II. The observed dependency of leaching rate on fiber dimensions includes any effect of drawing per se.

TABLE II
DEPENDENCY OF LEACHING RATES ON FIBER DIMENSIONS AND LEACHING MEDIUM

| | Percent of Original BEO Content Left in Fibers | | | | | |
|---|---|---|---|---|---|---|
| | Undrawn (50μW.T.[1]) Fibers | | | Drawn (23μW.T.) Fibers | | |
| Leach Time | ¼ hr. | 1 hr. | 16 hrs. | ¼ hr. | 1 hr. | 16 hrs. |
| $CH_2Cl_2$ | 10.0% | 6.5% | 5.5% | 5.5% | 5.4% | 5.4% |
| $CH_3-CCl_3$ | 24.0 | 17.0 | 12.1[2] | 10.0 | 8.6 | 7.3[2] |
| $CH_3-CH_2OH$ | — | 22.0 | — | — | 13.5 | — |

NOTES:
[1] W.T. = Wall Thickness
[2] When the fibers which had been leached with trichloroethane for 16 hours were further leached with methylene chloride for 15 minutes, the residual BEO levels were reduced to ~5.6% in each instance.

EXAMPLE 3

Replicate lengths of fibers designated in Table I as 5-A-1, 5-B-1 and 5-C-1 (none of which were drawn after spinning), 5-B-3 and 5-C-3 (both post-spin drawn to 5:1 ratio) were leached with ethanol for 24 hours or with methylene chloride for 4 hours. The residual BEO contents of the A and B series leached fibers were determined by gas phase chromatography. Permeabilities of all the leached fibers were determined as in Example 1, the fiber lengths having been mounted in beaker U.F. units. The dimensions of the fibers before leaching are included with the BEO residuals and permeabilities in Table III-A.

TABLE III-A
EFFECTS OF POST-SPIN DRAWING AND LEACH MEDIUM ON RESIDUAL BEO CONTENT AND PERMEABILITY

| # | Leach Medium | Time | Fiber | Post Spin Draw Ratio | Dimensions Before Leach I.D. | O.D. | W.T. | Percent of Original BEO Content Left | G.P.R. |
|---|---|---|---|---|---|---|---|---|---|
| 1 | ETOH | 24 hrs. | PE-5A-1 | — | 401 | 577 | 88 | 5.1% | $6.6 \times 10^{-6}$ |
| 2 | $CH_2Cl_2$ | 4 | " | — | " | " | " | 2.4 | $1.6 \times 10^{-5}$ |
| 3 | EtOH | 24 | PE-5B-3 | 5:1 | 317 | 469 | 76 | 3.7 | $3.9 \times 10^{-4}$ |
| 4 | $CH_2Cl_2$ | 4 | " | " | " | " | " | 1.6 | $1.0 \times 10^{-3}$ |
| 5 | $CH_2Cl_2$ | 4 | PE-5C-3 | " | 328 | 486 | 79 | — | $2.7 \times 10^{-3}$ |
| 6 | EtOH | 24 | Pe-5B-1 | — | 755 | 1079 | 162 | 3.7 | $8.2 \times 10^{-6}$ |
| 7 | $CH_2Cl_2$ | 4 | " | — | " | " | " | 3.8 | $1.4 \times 10^{-5}$ |
| 8 | $CH_2Cl_2$ | 4 | PE-5C-1 | — | 765 | 1091 | 163 | — | $4.5 \times 10^{-6}$ |

To facilitate comparisons, the date of Table III-A are recapitulated in Table III-B. For example, leach numbers 6 and 7 (in Table III-A) may be compared (Comparison A in Table III-B) as differing with respect to both the leach medium employed and duration of leaching and as being the same with respect to fiber size and in not having been post-spin drawn.

TABLE III-B

| Comparison | Factors Held Constant | Varied | Leach # | Residual BEO Level | GPR | Ratio of GPR's |
|---|---|---|---|---|---|---|
| A | Fiber size. Not drawn. | Leach medium and time. | 7 | 3.8 | $1.40 \times 10^{-5}$ | 1.71 |
| | | | 6 | 3.7 | $0.82 \times 10^{-5}$ | |
| B | Fiber size. Not drawn. | Leach mdium and time. | 2 | 2.4 | $1.60 \times 10^{-5}$ | 2.43 |
| | | | 1 | 5.1 | $0.66 \times 10^{-5}$ | |
| C | Fiber size. Not drawn. | Leach medium and time. | 4 | 1.6 | $1.0 \times 10^{-3}$ | 2.50 |
| | | | 3 | 3.7 | $0.4 \times 10^{-3}$ | |
| D | Leach medium | Drawn | 3 | 3.7 | $39.00 \times 10^{-5}$ | 59.1 |

TABLE III-B-continued

| Comparison | Factors Held Constant | Factors Varied | Leach # | Residual BEO Level | GPR | Ratio of GPR's |
|---|---|---|---|---|---|---|
| | and time. Fiber size. | Not drawn | 1 | 5.1 | $0.66 \times 10^{-5}$ | |
| E | Leach medium and time. | Drawn | 4 | 1.6 | $10 \times 10^{-4}$ | 62.5 |
| | Fiber size. | Not drawn | 2 | 2.4 | $0.16 \times 10^{-4}$ | |
| F | Leach medium and time. | Fiber size | 6 | 3.7 | $8.2 \times 10^{-6}$ | 1.24 |
| | Not drawn. | | 1 | 5.1 | $6.6 \times 10^{-6}$ | |
| G | Leach medium and time. | Fiber size | 7 | 3.8 | $1.4 \times 10^{-5}$ | 0.88 |
| | Not drawn. | | 2 | 2.4 | $1.6 \times 10^{-5}$ | |
| H | Leach medium and time. | Drawn to 76μ | 3 | 3.7 | $39.0 \times 10^{-5}$ | 47.6 |
| | | Not drawn 162μ | 6 | 3.7 | $0.82 \times 10^{-5}$ | |
| I | Leach medim and time. | Drawn to 77.5μ avg. | 4,5 | est. 1.6 | $185 \times 10^{-5}$ average | 200. |
| | | Not drawn 162.5μ avg. | 7,8 | est. 3.8 | $0.925 \times 10^{-5}$ average | |

Taking comparison A, B, C, F and G as one group and contrasting D, E, H and I as another group, it is clearly evident that post-spin drawing before leaching has a much more beneficial effect on permeability than can be attributed simply to facilitating more complete solvent (BEO) removal (by fiber wall thickness reduction). It should be noted that, in fact, the effect of wall thickness reduction may even by countered to some extent by the concurrent reduction in fiber inner diameter (making interior wetting by the leach medium more difficult).

EXAMPLE 4

Hollow fibers are prepared from a molten mixture consisting of polyethylene resin 70065 (80 wt. %) and 2-butoxyethyl oleate (20 wt.%), in the manner in which fibers PE-5A-6 (Example 1 herein) were prepared are of comparable dimensions and are found to have $O_2$ gas permeabilities, as above defined, of at least $2 \times 10^{-5}$.

The foregoing examples are illustrative only and are not to be construed as restricting the scope of the present invention, which is limited only according to the appended claims.

Scanning electron micrographs of membranes of this invention reveal an internal structure of interconnected porous domains. The size of these porous domains varies from a maximum of ~1 micron to the smallest resolveable by the microscope of ~0.1μ. The inability of some dissolved solutes to pass through the membrane indicates the minimum pore size is many times smaller than can be seen with the scanning electron microscope. The domains of porosity are distributed quite uniformly throughout the membrane. These photographs reveal that very few, if any, of these porous regions are completely encapsulated by the polyethylene. Instead, the porous regions tend to be connected to the bordering porous regions. This effect of contiguous pores being connected to each other, leads to the usefulness of the membrane. Being connected, the adjacent porous regions provide a continuous, if somewhat tortuous, path from one side of the membrane to the other.

On the basis of the following considerations, maximum pore radii of the fibers produced by the present method are estimated to range up to about 50A.

The most rapid and practical method of estimating the effective pore size of a membrane is by ultrafiltration experiments. A solution of a solute of know molecular size is pressurized against one side of the membrane. The permeate which consequently passes through the pores of the membrane is collected and analyzed. The rejection coefficient (R) of the membrane is:

$$R = 100 \left(1 - \frac{C_P}{C_B}\right) \%,$$

where $C_P$ is the concentration of solute in the permeate, and $C_B$ is the concentration of solute in the initial solution. In this process, the pores of the membrane behave as a molecular sieve. Solute molecules larger than the pore diameter are excluded from the interior of the pore. The pores then preferentially transport the very small solvent molecules. Hollow fiber membrane PE-5A-5 (Table I) reject >99.9% of the albumin molecules, allowing only water to pass through the membrane. The albumin molecule in aqueous solution exhibits a radius of gyration of approximately 30A. Since the pores of the microporous polyethylene do not allow the passage of the solute albumin, the radius of these pores must, at some point, be smaller than the effective radius of the solute albumin (30A). Other fibers, such as PE-5A-3, exhibit albumin rejections of only about 95% and accordingly must include some pores having radii substantially larger than 30A. Assuming a normal Gausian distribution of pore sizes, a radius of about 50A appears to be reasonable maximum for the latter type of fibers.

We claim:

1. A process for preparing a hollow fiber which consists essentially of polyethylene and is a microporous hollow fiber in which the porosity is contiguous and the $O_2$ gas permeability is at least $2 \times 10^{-5}$ cc (STP) per cm² per second per cm Hg transmembrane pressure differential, said process comprising:

(a) providing a polyethylene/ester mixture of which about 20 to about 80 weight percent consists essentially of polyethylene and the balance consists essentially of an ester or a mixture of esters, of the formula $R^1(COOR^2)_n$, wherein $n$ is 1 or 2, $R^1$ is a mono- or divalent hydrocarbon radical, optionally interrupted by one or two —O— or —S— links, and containing from 1 to 32 carbons, each $R^2$ independently is an aliphatic hydrocarbon radical of 2–26 carbon atoms or consists of two aliphatic hydrocarbon moieties joined by an —O— or —S— link and containing a total of from 3 to 20 carbons;

(b) heating said polyethylene/ester mixture to a temperature at which it is a homogeneous liquid but below the boiling or decomposition temperature thereof, and extruding it from a spinnerette in the form of a hollow fiber;

(c) cooling the issuing extrudate to solidify it while maintaining sufficient tension on the forming fiber to achieve a draw ratio of from about 1.0/1 to about 40/1;

(d) at a temperature above the melting point of the ester, but at least 10° below the cloud point of said homogeneous liquid, post-spin drawing the solidified fiber under sufficient tension to achieve an overall draw ratio of from about 1.5/1 to about 800/1; and (e) contacting the post-spin drawn fiber with a liquid ester-removal medium, at a temperature intermediate of the freezing point of the medium and the flow point of the polyethylene, until at least a major proportion of the ester is removed from the fiber.

2. The process of claim 1 in which said ester has the formula $R^1$—$COOR^2$, in which $R^1$ is a monovalent radical defined as in claim 1 and $R^2$ consists of two aliphatic hydrocarbon moieties joined by an —O— link and containing a total of from 3 to 20 carbons.

3. The process of claim 1 in which $R^1$ is an aliphatic radical containing from 10 to 24 carbons.

4. The process of claim 1 in which said ester has the formula $R^1$—$COOR^2$, in which $R^1$ is a monovalent radical defined as in claim 1 and $R^2$ is an aliphatic hydrocarbon radical of 2–20 carbon atoms.

5. The process of claim 2 in which said ester is butyl stearate or 2-butoxyethyl oleate.

6. The process of claim 2 in which said ester is 2-butoxyethyl oleate.

7. The process of claim 1 in which said post-spin drawn fiber is contacted with methylene chloride or ethanol until the residual content of said solvent therein is less than 5 weight percent.

8. The process of claim 1 in which said overall draw ratio is within the range of from about 20/1 to about 500/1.

* * * * *